United States Patent
Kashiwagi et al.

(10) Patent No.: US 11,252,288 B2
(45) Date of Patent: Feb. 15, 2022

(54) INFORMATION PROCESSING APPARATUS FOR COMMUNICATING WITH IMAGE FORMING APPARATUS AND CONTROL METHOD FOR CONTROLLING THE SAME

(71) Applicant: CANON KABUSHIKI KAISHA, Tokyo (JP)

(72) Inventors: Masaki Kashiwagi, Hiratsuka (JP); Takeshi Kaneda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/878,417

(22) Filed: May 19, 2020

(65) Prior Publication Data

US 2020/0374409 A1 Nov. 26, 2020

(30) Foreign Application Priority Data

May 23, 2019 (JP) .............................. JP2019-097147

(51) Int. Cl.
H04N 1/00 (2006.01)
(52) U.S. Cl.
CPC ..... H04N 1/00411 (2013.01); H04N 1/00204 (2013.01)
(58) Field of Classification Search
CPC ........... H04N 1/00411; H04N 1/00204; H04N 1/00482; H04N 1/00466; H04N 1/00413; H04N 1/0048; G06F 3/1205; G06F 3/1255
See application file for complete search history.

(56) References Cited

U.S. PATENT DOCUMENTS

| 2002/0161740 A1* | 10/2002 | Nakamura | G06F 3/1204 |
| 2003/0112456 A1* | 6/2003 | Tomita | G06F 3/1257 358/1.13 |
| 2009/0201531 A1* | 8/2009 | Pandit | G06F 3/1285 358/1.15 |
| 2015/0172483 A1* | 6/2015 | Kishida | H04N 1/0048 358/1.13 |
| 2019/0294386 A1* | 9/2019 | Iwamoto | G06F 3/1204 |

FOREIGN PATENT DOCUMENTS

JP 2015-114906 A 6/2015

OTHER PUBLICATIONS

IPP Presets, The Printer Working Group, IPP Registration, Dec. 2017.

* cited by examiner

*Primary Examiner* — Iriana Cruz
(74) *Attorney, Agent, or Firm* — Canon U.S.A., Inc. I.P. Division

(57) ABSTRACT

In a case where extension information is included in information regarding presets provided by a printing apparatus, an information processing apparatus prohibits a host side from editing the presets, thereby preventing the occurrence of a conflict between settings of a print job. In a case where extension information is not included in the presets, the information processing apparatus allows the host side to edit the presets, thereby providing a method for changing some of the presets to a user.

17 Claims, 14 Drawing Sheets

FIG.5

*501 PRESET TARGET ITEMS* — *503 CLASSIFICATION OF ATTRIBUTE AND RANGE* — *502 EXAMPLES OF PRESETS* — *504 CATALOG PRINTING PRESET*

| PresetName | ipp attribute | value | Function Type | Quotation | Application | Expense | Drawing | Catalog | DM |
|---|---|---|---|---|---|---|---|---|---|
| Copies | copies | N | std | 3 | 2 | 1 | 1 | 50 | 1 |
| ColorMode | print-color-mode | color | std | ○ | ○ | ○ | ○ | ○ | ○ |
|  |  | monochrome | std |  |  |  |  |  |  |
| Duplex | sides | one-sided | std | ○ | | ○ | ○ | ○ | ○ |
|  |  | two-sided-long-edge | std |  |  |  |  |  |  |
|  |  | two-sided-short-edge | std |  | ○ |  |  |  | ○ |
| Nup | number-up | 1 | std |  | ● |  |  |  |  |
|  |  | 2 | ext |  |  |  |  |  |  |
|  |  | 4 | ext |  |  |  |  |  |  |
|  |  | 6 | ext |  |  |  |  |  |  |
|  |  | 8 | ext |  |  |  |  |  |  |
|  |  | 12 | ext |  |  |  |  |  |  |
|  |  | 16 | ext |  |  |  |  |  |  |
| Staple | finishing=staple-xxx-xxx | top-left | std |  |  | ○ | ○ |  |  |
|  |  | bottom-left | std |  |  |  |  |  |  |
|  |  | top-right | ext |  |  |  |  |  |  |
|  |  | bottom-right | ext |  |  |  |  |  |  |
|  |  | dual-left | std |  |  |  |  |  |  |
|  |  | dual-bottom | std |  |  |  |  |  |  |
|  |  | dual-right | ext |  |  |  |  |  |  |
|  |  | dual-top | ext |  |  |  |  |  |  |
| Stapleless-Stich | finishing="vender-extension" | top-left | ext | ● |  |  |  | ● |  |
|  |  | bottom-left | ext |  |  |  |  |  |  |
|  |  | top-right | ext |  |  |  |  |  |  |
|  |  | bottom-right | ext |  |  |  |  |  |  |
|  |  | dual-left | ext |  |  |  |  |  |  |
|  |  | dual-bottom | ext |  |  |  |  |  |  |
|  |  | dual-right | ext |  |  |  |  |  |  |
|  |  | dual-top | ext |  |  |  |  |  |  |

FIG.6-1

● EXAMPLE OF CAPABILITY NOTIFICATION FROM PRINTER

```
"Get-Printer-Attributes";

RequestAttributes = (
    {
      "attributes-charset" = "utf-8";
      "attributes-natural-language" = en;
      "printer-uri" = "ipp://xxxx.local.:631/ipp/print";
    }
  );
  RequestId = 123456;                                              — 610

ResponseAttributes = (
    {
      "attributes-charset" = "utf-8";
      "attributes-natural-language" = "ja-jp";
    }
    {
      "charset-configured" = "utf-8";
      "charset-supported" = "utf-8";
      "print-color-mode-default" = "color";
      "print-color-mode-supported" = (
        auto,
        color,
        monochrome
      );
      "compression-supported" = none;
      "copies-default" = 1;
      "copies-supported" =        (
        lower = 1;
        upper = 9999;
      );
      "document-format-default" = "application/octet-stream";
      "document-format-preferred" = "application/pdf";
      <OMIT>                                                       — 611
      ┌─────────────────────────────────────────────────┐
      │ job-presets-supported={                          │
      │   "preset-name" = "Quotation"                    │
      │   "copies" = 3                                   │
      │   "print-color-mode" = "color"         613       │ — 612
      │   "sides" = "one-sided"                          │
      │   "ext-cn-stapleless-stitch" = "position-top-left"│
      │ },                                               │
      └─────────────────────────────────────────────────┘
      ┌─────────────────────────────────────────────────┐
      │ {                                                │
      │   preset-name ="Catalog"                         │
      │   "copies" = 50                                  │
      │   "print-color-mode" = "monochrome"              │ — 614
      │   "sides" = "one-sided"                          │
      │   "finishing" = "staple-dual-right"  — 615       │
      │ },                                               │
      └─────────────────────────────────────────────────┘
      <OMIT>
      ┌─────────────────────────────────────────────────┐
      │ {                                                │
      │   preset-name ="Drawing"                         │
      │   "copies" = 1                                   │
      │   "print-color-mode" = "monochrome"              │ — 616
      │   "sides" = "one-sided"                          │
      │   "finishing" = "staple-dual-left"               │
      │ }                                                │
      └─────────────────────────────────────────────────┘
    }
  )
```

FIG.6-2

● EXAMPLES OF PRINT JOBS

EXAMPLE OF PRINT JOB (612 IS APPLIED)

"Create-Job";
  OperationAttributes = (
    {
      "attributes-charset" = "utf-8";
      "attributes-natural-language" = en;
      "printer-uri" = "ipp://xxxx.local.:631/ipp/print";
      "requesting-user-name"= "suzuki"
    }
  );                                          ─621
  JobAttributes = (
    "copies"= 3;
    "print-color-mode"= "color";       622
    "sides"= "one-sided";
    "ext-cn-stapleless-stitch"= "position-top-left"
  );

EXAMPLE OF PRINT JOB (614 IS APPLIED)

"Create-Job";
  OperationAttributes = (
    {
      "attributes-charset" = "utf-8";
      "attributes-natural-language" = en;
      "printer-uri" = "ipp://xxxx.local.:631/ipp/print";
      "requesting-user-name"= "suzuki"
    }
  );                                          ─623
  JobAttributes = (
    "copies"= 50;
    "print-color-mode"= "monochrome";
    "sides"= "one-sided";
    "finishing"= "staple-dual-right"  ─624
  );

EXAMPLE OF PRINT JOB (616 IS APPLIED)

"Create-Job";
  OperationAttributes = (
    {
      "attributes-charset" = "utf-8";
      "attributes-natural-language" = en;
      "printer-uri" = "ipp://xxxx.local.:631/ipp/print";
      "requesting-user-name"= "suzuki"
    }
  );                                          ─625
  JobAttributes = (
    "copies"= 1;
    "print-color-mode"= "monochrome";
    "sides"= "one-sided";
    "finishing"= "staple-dual-left"   ─626
  );

● EXAMPLES OF PRINT JOBS IN CONFLICT STATES

EXAMPLE OF PRINT JOB (612 IS APPLIED)

"Create-Job";
  OperationAttributes = (
    {
      "attributes-charset" = "utf-8";
      "attributes-natural-language" = en;
      "printer-uri" = "ipp://xxxx.local.:631/ipp/print";
      "requesting-user-name"= "suzuki"
    }
  );                                          ─631
  JobAttributes = (
    "copies"= 3;
    "print-color-mode"= "color";    633
    "sides"= "one-sided";              632
    "finihsing"= "staple-top-left";
    "ext-cn-stapleless-stitch"= "position-top-left"
  );

EXAMPLE OF PRINT JOB (614 IS APPLIED)

"Create-Job";
  OperationAttributes = (
    {
      "attributes-charset" = "utf-8";
      "attributes-natural-language" = en;
      "printer-uri" = "ipp://xxxx.local.:631/ipp/print";
      "requesting-user-name"= "suzuki"
    }
  );                                          ─641
  JobAttributes = (
    "copies"= 50;
    "print-color-mode"= "monochrome";
    "sides"= "one-sided";
    "finishing"= "staple-dual-left", "staple-dual-right"
  );
                                        643        642

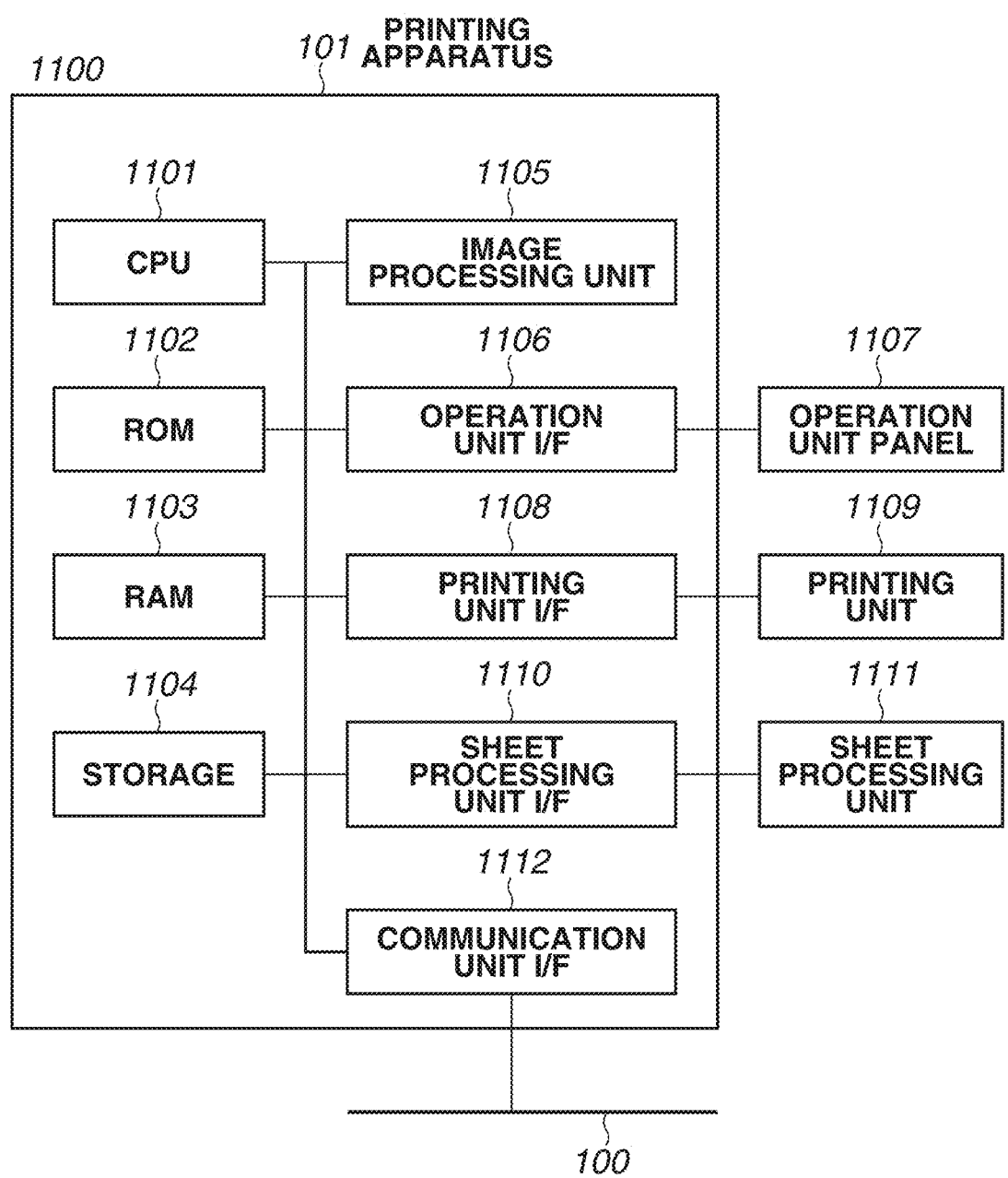

INFORMATION PROCESSING APPARATUS FOR COMMUNICATING WITH IMAGE FORMING APPARATUS AND CONTROL METHOD FOR CONTROLLING THE SAME

BACKGROUND OF THE INVENTION

Field of the Invention

The present invention relates to an information processing apparatus for communicating with an image forming apparatus and a control method for controlling the same.

Description of the Related Art

A technique is known in which an information processing apparatus generates print data not via a printer driver (or a print application) designed to use an individual printing apparatus. For example, a print service provided as a function of an operating system (OS) of an information processing apparatus or a versatile print service provided by a print server on a cloud also generates the print data and transmits the print data to a printing apparatus. In such a print service, a network protocol (the Internet Printing Protocol (IPP)) for transmitting the print data to the printing apparatus and causing the printing apparatus to execute printing is implemented.

Even a print server or an information processing apparatus that provides a versatile print service in compliance with the IPP standard is expected to be compatible with various types of printing apparatuses. Hence, in order to be compatible with functions and specifications that differ from one printing apparatus to another, the information processing apparatus that uses a versatile print service needs to manage configuration information regarding printing apparatuses.

The Printer Working Group discusses IPP presets (20171214) that, in IPP printing, group the functions (setting items) provided by a printer and provide the grouped functions as favorite settings.

Meanwhile, in a known technique, in order to provide a setting screen with higher operability to a setting screen of a conventional printer driver, it is determined, based on the configuration information regarding a printing apparatus, whether the capability of the printing apparatus recognized on the print setting screen are actually usable, and an unusable setting is adjusted (the publication of Japanese Patent Application Laid-Open No. 2015-114906).

In an extension setting mode of IPP presets, it is permitted to include a print setting function that is not supported by a host terminal (an IPP client), in favorite settings which a printing apparatus (an IPP server) notifies to the host terminal. The host terminal (the IPP client), however, is requested to include all items notified as presets from the printing apparatus in print job attributes. Consequently, by selecting a desired preset, it is possible to set up in a print job a setting item for which the host terminal (the IPP client) does not have a setting screen, and give an instruction to the printing apparatus based on the setting item.

In IPP presets, however, the host terminal (the IPP client) cannot interpret the content of a setting item other than the that notified and supported by the printing apparatus, and therefore does not determine whether the setting item is prohibited from being used with another setting item. Thus, in a case where a user changes some of presets notified on the host terminal, an item of the presets changed on the host terminal may conflict with the setting item other than notified and supported by the printing apparatus. In IPP presets, the setting item that is not supported by the host terminal (the IPP client) can be included in presets. If, however, the setting item meets a conflict condition and printing is prohibited, the effect of providing a simplified setting method is impaired, which is the essential function of IPP presets.

SUMMARY OF THE INVENTION

The present invention is directed to an information processing apparatus having the following configuration.

According to an aspect of the present invention, an information processing apparatus for executing a print service that transmits print data in which a setting regarding printing is made, includes a reception unit configured to receive a complex setting including a plurality of settings regarding printing from an image forming apparatus, a holding unit configured to hold a setting that is not supported by the print service from among the settings regarding printing included in the complex setting without changing the setting, a display unit configured to display a setting screen on which an instruction can be given to change a setting supported by the print service from among the settings regarding printing included in the complex setting, and a transmission unit configured to transmit to the image forming apparatus a setting regarding printing made according to an instruction given through the setting screen, and the setting regarding printing held in the holding unit.

Further features of the present invention will become apparent from the following description of exemplary embodiments with reference to the attached drawings.

BRIEF DESCRIPTION OF THE DRAWINGS

FIG. 5 is a diagram illustrating examples of presets held in a print preset saving unit of the printing apparatus.

FIG. 6-1 is a diagram illustrating an example of an capability notification including presets transmitted from the printing apparatus to the information processing apparatus.

FIG. 6-2 is a diagram illustrating examples of Internet Printing Protocol (IPP) jobs in which the presets are reflected and which are transmitted from formation processing apparatus to the printing apparatus.

FIG. 11 is a diagram illustrating an example of a block diagram illustrating a hardware configuration of the printing apparatus.

DESCRIPTION OF THE EMBODIMENTS

Figure 1:
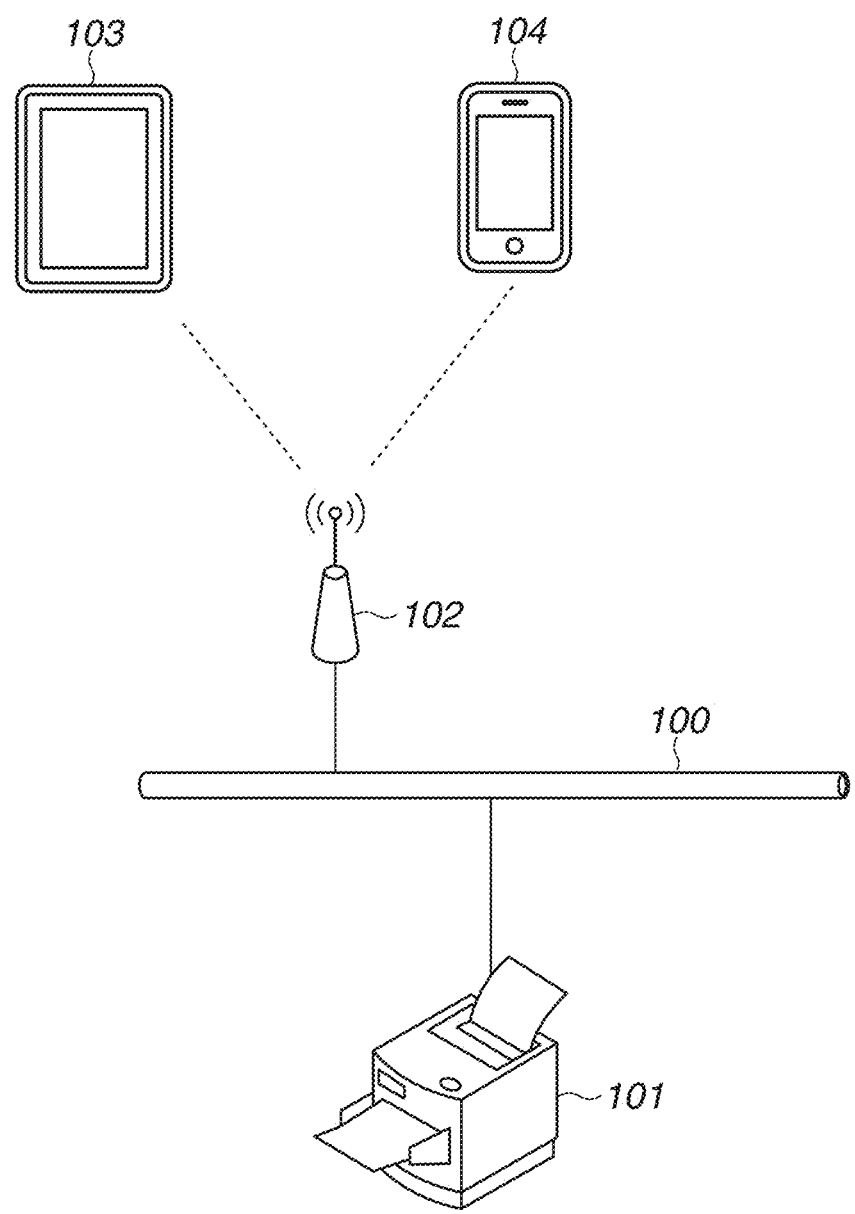
FIG. 1 is a diagram illustrating an example of a configuration of a printing system.

With reference to the attached drawings, exemplary embodiments of the present invention will he described in detail below. FIG. 1 is a diagram illustrating the configuration of a printing system according to an exemplary embodiment of the present invention.

On a local area network (LAN) 100, a printing apparatus 101 and an access point (AP) 102 are connected to each other so that the printing apparatus 101 and the AP 102 can communicate with each other. Although the present exemplary embodiment is described using the printing apparatus as an example, the printing apparatus such as a multifunction peripheral (MFP) in which a printing apparatus has a scanner function and a fax function may also he used. The present exemplary embodiment is also described using mobile terminals 103 and 104 such as a tablet and a smartphone as examples of an information processing apparatus. In the following description, the tablet 103 and the smartphone 104 will be collectively referred to as an "information processing apparatus". The information processing apparatus and the printing apparatus 101 on the LAN 100 can communicate with each other via the AP 102. The present exemplary embodiment is described using the above configuration as an example of the printing system. The present invention, however, is not limited to this configuration, and at least one or more information processing apparatuses and at least one or more printing apparatuses only have to be connected to each other via a network so that the information processing apparatus and the printing apparatus can communicate with each other. The network may also be a wireless network or a wired network.

The printing apparatus 101 has a reading function for reading an image on a document, and a printing function for printing an image on a sheet (a recording medium). The printing apparatus 101 can execute a printing process based on print data received via a network.

Figure 2:
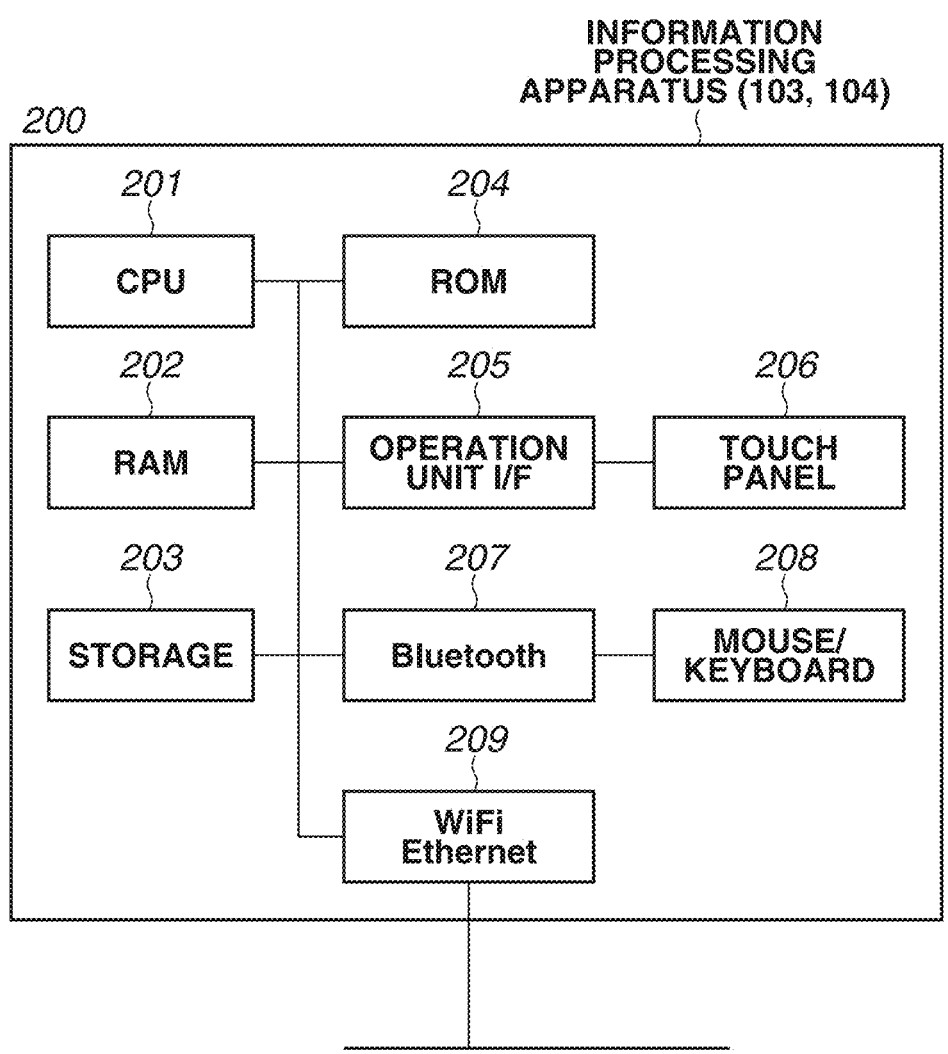
FIG. 2 is a block diagram illustrating an example of a hardware configuration of an information processing apparatus.

FIG. 2 is a hardware block diagram of the information processing apparatus (the mobile terminal 103 or 104).

A control unit 200 including a central processing unit (CPU) 201 controls the operation of the entirety of the information processing apparatus. The CPU 201 loads a program stored in a read-only memory (ROM) 204 or storage 203 into a random-access memory (RAM) 202 and executes the program, thereby performing various types of control such as control of a print setting screen, generation of print data, and transfer of a print job. The ROM 204 stores a control program and a boot program that can be executed by the CPU 201. The RAM 202 is a main storage memory of the CPU 201 and is used as a work area or a temporary storage area into which various programs are loaded. The storage 203 stores an operating system (OS), a print application, an OS print framework, a print job generated by the OS print framework, and various pieces of setting information. The OS print framework is an example of a print service. In the present exemplary embodiment, as the storage 203, an auxiliary storage device such as a hard disk drive (HDD) is used. Alternatively, a non-volatile memory such as a solid-state drive (SSD) may be used. A touch panel 206 is connected to an operation unit I/F 205. The touch panel 206 not only draws the s for applications and the print setting screen, but also notifies an application operating on the CPU 201 of a touch operation of a user. Input devices such as a mouse and a keyboard (208) that receive an instruction from the user are connected to the information processing apparatus via Bluetooth (registered trademark) (207). The information processing apparatus communicates with an external device via a Wi-Fi module (209).

Figure 3:
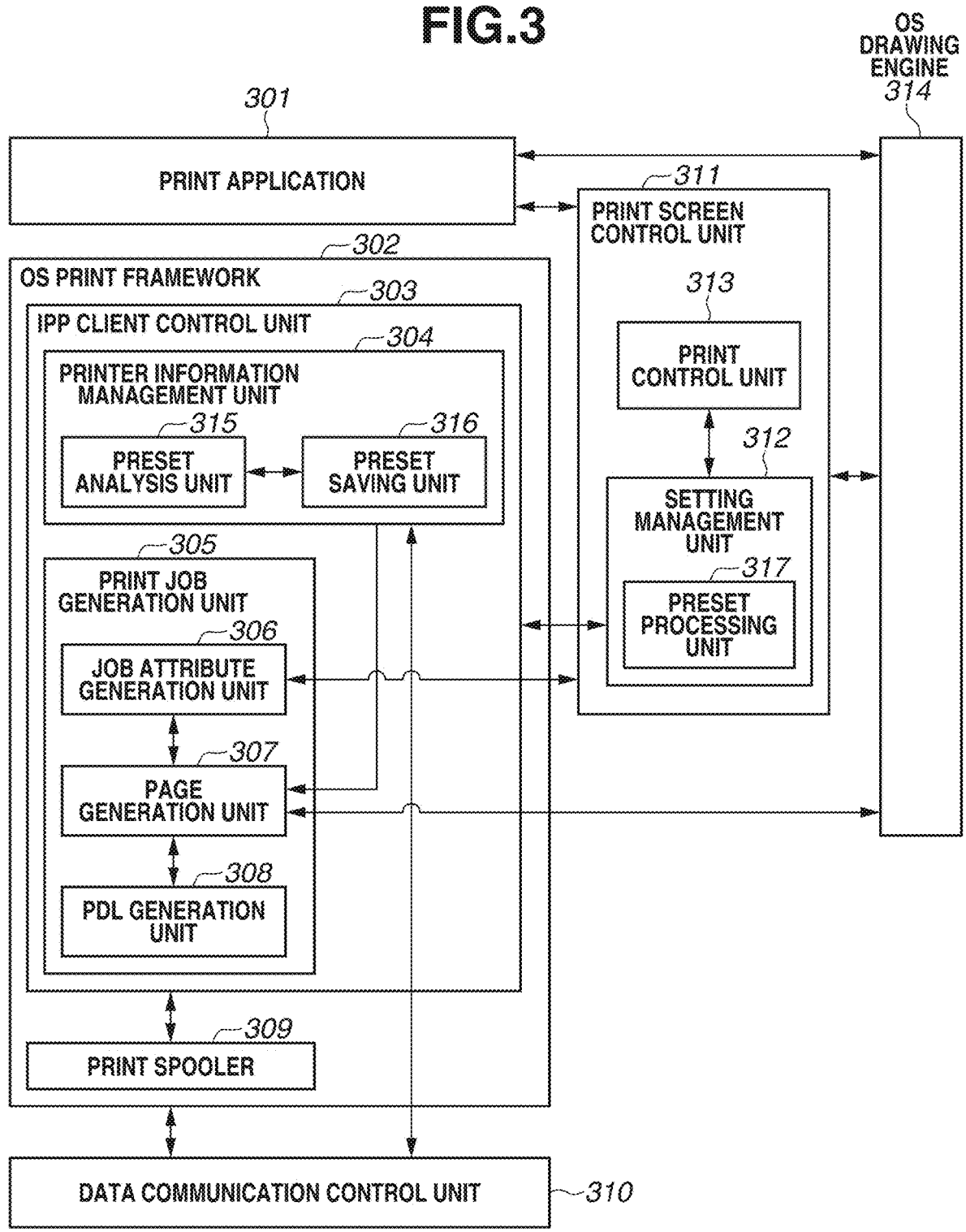
FIG. 3 is a functional block diagram illustrating an example of a software configuration of the information processing apparatus.

FIG. 3 is a functional block diagram illustrating the software configuration of the information processing apparatus (the mobile terminal 103 or 104). FIG. 3 schematically illustrates the functional blocks of the software. Each functional block is stored in the storage 203. The functional blocks are loaded into the RAM 202 and executed by the CPU 201. The configuration realizes functions expected of the functional blocks.

An application 301 is any application installed on the information processing apparatus by the user and is a general application for a word processor, a spreadsheet, a database, e-mail, or a web browser. An OS print framework (302) includes an Internet Printing Protocol (IPP) client control unit (303), a print spooler (309), and a print screen control unit (311).

The IPP client control unit (303) includes a printer information management unit (304) and a print job generation unit (305). The printer information management unit (304) sends an inquiry to the printing apparatus (101) via a data communication control unit (310) and acquires capability information regarding the printing apparatus (101) and a registered preset. A preset analysis unit (315) analyzes the acquired preset, and a preset saving unit (316) saves the analyzed preset. The capability information regarding the printing apparatus (101) includes A color mode: print-color-mode-supported Whether a number of copies can be supported: copies-supported The finishing capability of the printer: finishings-supported The optimal generation direction of an image: feed-orientation-supported and these pieces of information are referenced by the print job generation unit (305).

In response to a call from the application (301), the print screen control unit (311) displays a print setting screen. The user makes print settings on the print setting screen and starts printing.

Print setting items are displayed on the print setting screen as follows. The print screen control unit (311) acquires capability information regarding a function set that can be provided by the printing apparatus (101), and displays the print setting screen and setting items within the range in which the function set can be provided. When a preset is selected on the print setting screen, print setting items to be displayed on the print setting screen are determined by a preset processing unit (317) of a setting management unit (312). The preset processing unit (317) sends an inquiry to the printer information management unit (304). The printer information management unit (304) causes the preset analysis unit (315) to analyze attribute values of the preset saved in the preset saving unit (316). The preset processing unit (317) displays the print setting screen and setting items based on the analysis result of the preset analysis unit (315).

The print job generation unit (305) includes a job attribute generation unit (306), a page generation unit (307), and a page description language (PDL) generation unit (308).

The print job generation unit (305) receives an instruction from the print screen control unit (311) and generates a print job. The job attribute generation unit (306) cooperates with the setting management unit (312) to generate a job attribute and a document attribute of an IPP job based on setting items on the print setting screen. Then, the job attribute generation unit (306) transmits the job attribute and the document attribute of the IPP job as an IPP packet to an IPP print service of the printing apparatus (101) through the print spooler (309) and the data communication control unit (310).

The page generation unit (307) causes the PDL generation unit (308) to convert data generated through an OS drawing engine (314) by the application (301) from an OS drawing format to a print format according to a format supported by the printing apparatus (101). The page generation unit (307) acquires the format supported by the printing apparatus (101) and the image generation direction from the printer information management unit (304) and follows the specified format and image direction. The OS drawing engine (314) draws print page data in an OS standard drawing format according to a request from the application (301) and transmits the print page data to the page generation unit (307) of the OS print framework (302). The data communication control unit (310) transmits and receives an IPP packet, generated by the IPP client control unit (303), for communication to manage the printer and for job transmission and job management to and from the printing apparatus (101). If the printing apparatus (101) supports only the Printer Working Group (PWG) Raster format, a supported format which the printing apparatus (101) notifies to the information processing apparatus is the PWG Raster format. Thus, the PDL generation unit (308) generates data in the PWG Raster format by optimizing the data to the image direction specified by the printing apparatus (101).

Figure 4:
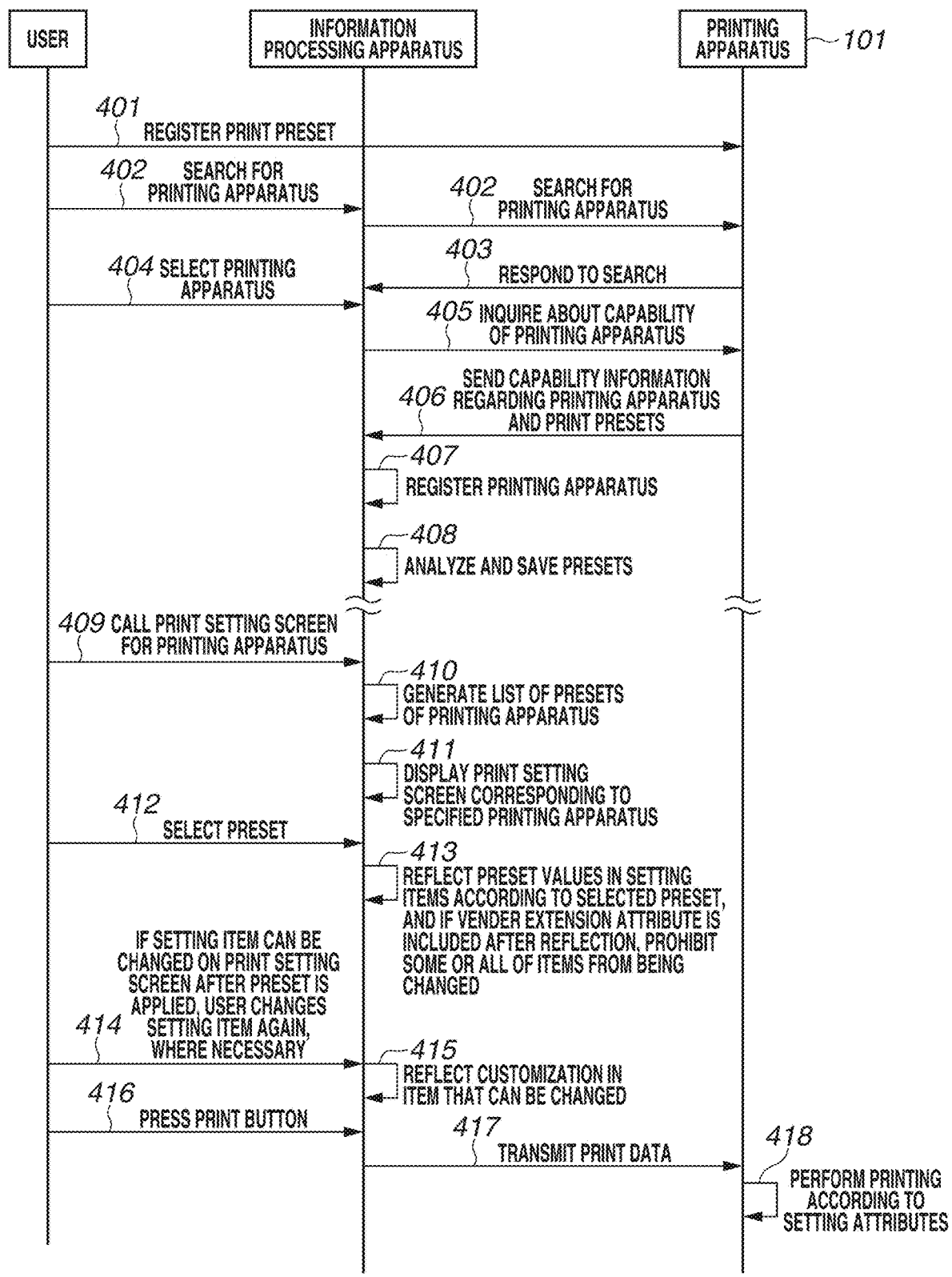
FIG. 4 is a diagram illustrating an example of a sequence from registration of a preset in a printing apparatus to printing, according to the present exemplary embodiment.

FIG. 4 illustrates an example of the sequence from the registration of a preset in the printing apparatus (101) until printing. In step S401, the user registers any print preset in the printing apparatus (101). In step S402, the user searches for the printing apparatus (101) through the information processing apparatus (103 or 104). In step S403, the printing apparatus (101) responds to the search request made through the information processing apparatus (103 or 104). A list on a printing apparatus selection screen (720) of the information processing apparatus (103 or 104) displays the printing apparatus (101) that has responded. In step S404, the user selects the printing apparatus (101) on the printing apparatus selection screen (720) of the information processing apparatus (103 or 104). In step S405, the information processing apparatus (103 or 104) inquires of the printing apparatus (101) selected on the printing apparatus selection screen (720) by the user, about the capability of the printing apparatus (101).

In step S406, the printing apparatus (101) sends capability information regarding the printing apparatus (101) and preset information regarding presets registered in the printing apparatus (101) to the information processing apparatus (103 or 104). In step S407, based on the information from the printing apparatus (101), the information processing apparatus (103 or 104) registers the printing apparatus (101). In step S408, the information processing apparatus (103 or 104) analyzes the capability information and the preset information sent from the printing apparatus (101) and registers and holds the analyzed capability information and preset information in the printer information management unit (304).

In step S409, the user calls a print setting screen (710) of the information processing apparatus (103 or 104). In step S410, the information processing apparatus (103 or 104) generates a list (731) of the presets of the printing apparatus (101) held in the preset saving unit (316), as a pull-down menu in the print setting screen (710). In step S411, the print screen control unit (311) of the info ion processing apparatus (103 or 104) generates and displays the print setting screen (710) including the pull-down menu of the presets. In step S412, the user selects a single preset from the preset selection list (731).

In step S413, the preset processing unit (317) of the information processing apparatus reflects the setting items included in the preset on print setting items in the setting items managed by the setting management unit (312). If the setting item in which the preset is reflected needs to be excluded or prohibited, the preset processing unit (317) prohibits the setting item from being changed, where necessary. In step S414, the user corrects a setting item that can be changed even after the preset is applied, where necessary. In step S415, the information processing apparatus (103 or 104) reflects the content of the correction by the user.

Simultaneously with pressing of a print button in step S416, in step S417, the print job generation unit (305) generates a print ticket based on the setting contents and transmits a job to the printing apparatus (101). In step S418, the printing apparatus (101) executes printing according to the setting contents.

FIG. 5 illustrates examples of presets of the printing apparatus (101) according to the present exemplary embodiment. Each preset is an example of a complex setting. The presets are stored in storage 1104 of the printing apparatus (101).

The printing apparatus (101) supports IPP attributes 501 as preset items. Specifically, six items, namely (1) specifying a number-of-copies (Copies), (2) color mode (ColorMode), (3) specifying two-sided printing (Duplex), (4) specifying Nup (Nup), (5) stapling (Staple), and (6) stapleless stitching (Stapleless-Stich), can be included in each preset. As examples of the presets, six types of presets 502 having different contents (Quotation, Application, Expense, Drawing, Catalog, and DM) are registered.

A column 503 indicates the classification of an attribute and a range. "std" represents an attribute and an attribute value that are supported as a preset item by both the information processing apparatus and the printing apparatus 101 (referred to as a "standard attribute"). "ext" represents an attribute and an attribute value that are supported as a preset item by the printing apparatus 101, but are not supported as a preset item by the information processing apparatus (referred to as a "vendor extension attribute"). Further, "ext" indicates that an attribute is supported by both the printing apparatus 101 and the information processing apparatus, but an attribute value is not supported by the information processing apparatus (referred to as "standard extension"). For example, a "catalog printing" preset (504) is a preset including four items, namely (1) specifying number-of-copies, (2) color mode, (3) specifying two-sided, and (5) stapling. Regarding the stapling, the "catalog printing" preset (504) includes a setting value that is not supported by the information processing apparatus. "○ (a white circle)" represents an attribute and an attribute value that are supported by the information processing apparatus. "● (a filled circle)" represents an attribute and an attribute value that are not supported by the information processing apparatus. The processing of a preset including an attribute and an attribute value that are not supported by the information processing apparatus will be described below. In the above description, an attribute supported by the information processing apparatus means an attribute supported by a print service of the information processing apparatus. Examples of the print service include an OS standard print service and a print service compliant with a predetermined print standard. The print service according to the present exemplary embodiment receives a print setting defined as a predetermined OS standard and also generates print data based on the print setting. Then, the print service transmits the print data to the printing apparatus 101. A print setting marked as "std" is an example of the print setting defined as the predetermined OS standard. Examples of the print data include predetermined PDL data, PostScript data, Portable Document Format (PDF) data, raster image data, and compression data of these pieces of data.

FIGS. 6-1 and 6-2 illustrate examples of messages including presets of the printing apparatus 101 and the information processing apparatus.

FIG. 6-1 illustrates capability information regarding the printing apparatus 101 which the printing apparatus 101 notifies to the information processing apparatus.

A notification message 610 indicates the capability information regarding the printing apparatus 101. In the notification message 610, a portion 611 indicates presets registered in the printer. The example of FIG. 6-1 illustrates a preset 612 for printing a quotation, a preset 614 for printing a catalog, and a preset 616 for printing a drawing. The quotation preset (612) includes a stapleless stitching setting 613 as a vendor extension attribute. The catalog preset (614) includes the setting value of a standard attribute that is defined by the IPP, and is vendor extension on the print setting screen (710) of the information processing apparatus, namely stapling at two places on a right side (615). The drawing preset (616) is a standard attribute including the information processing apparatus as a preset. The capability information notified by the printer can include a plurality of presets of the printer. Each preset includes one or more print settings.

FIG. 6-2 illustrates examples of information regarding a job ticket transmitted from the information processing apparatus to the printing apparatus 101.

A print job 621 is an example of a print job to which the preset 612 is applied (including a vendor extension attribute 622 regarding stapleless stitching).

A print job 623 is an example of a print job to which the preset 614 is applied (including standard extension 624 regarding stapling at two places on the right side).

A print job 625 is an example of a print job to which the preset 616 is applied (including a standard attribute 626 regarding stapling at two places on the left side).

The print job 621 includes an attribute and an attribute value that are not supported by the information processing apparatus, and the print job 623 includes an attribute value that is not supported by the information processing apparatus. Thus, if the user changes a print setting after the presets are applied, the attribute or the attribute value may conflict with an attribute included in the original presets. An example of the conflict of the print job 621 is a print job 631. An example of the conflict of the print job 623 is a print job 641. In the print job 631, stapleless stitching (632) as vendor extension conflicts with stapling (633) as a standard attribute that can he added on the print setting screen (710). In the print job 641, stapling (642) as standard extension conflicts with stapling (643) as a standard attribute that can be added on the print setting screen (710). Each preset may or may not include another print setting such as a setting indicating two-sided or one-sided printing.

Even the vendor extension attribute or the standard attribute as an IPP attribute as described above has the following issue. That is, in the case of a preset including extension that is not supported by an IPP client, if the user changes a setting on the print setting screen (710) of the information processing apparatus, both the setting made by the user and the original setting of the preset are reflected in a print job and conflict with each other. The present exemplary embodiment is directed to preventing the generation of the job tickets 631 and 641.

Figure 7:
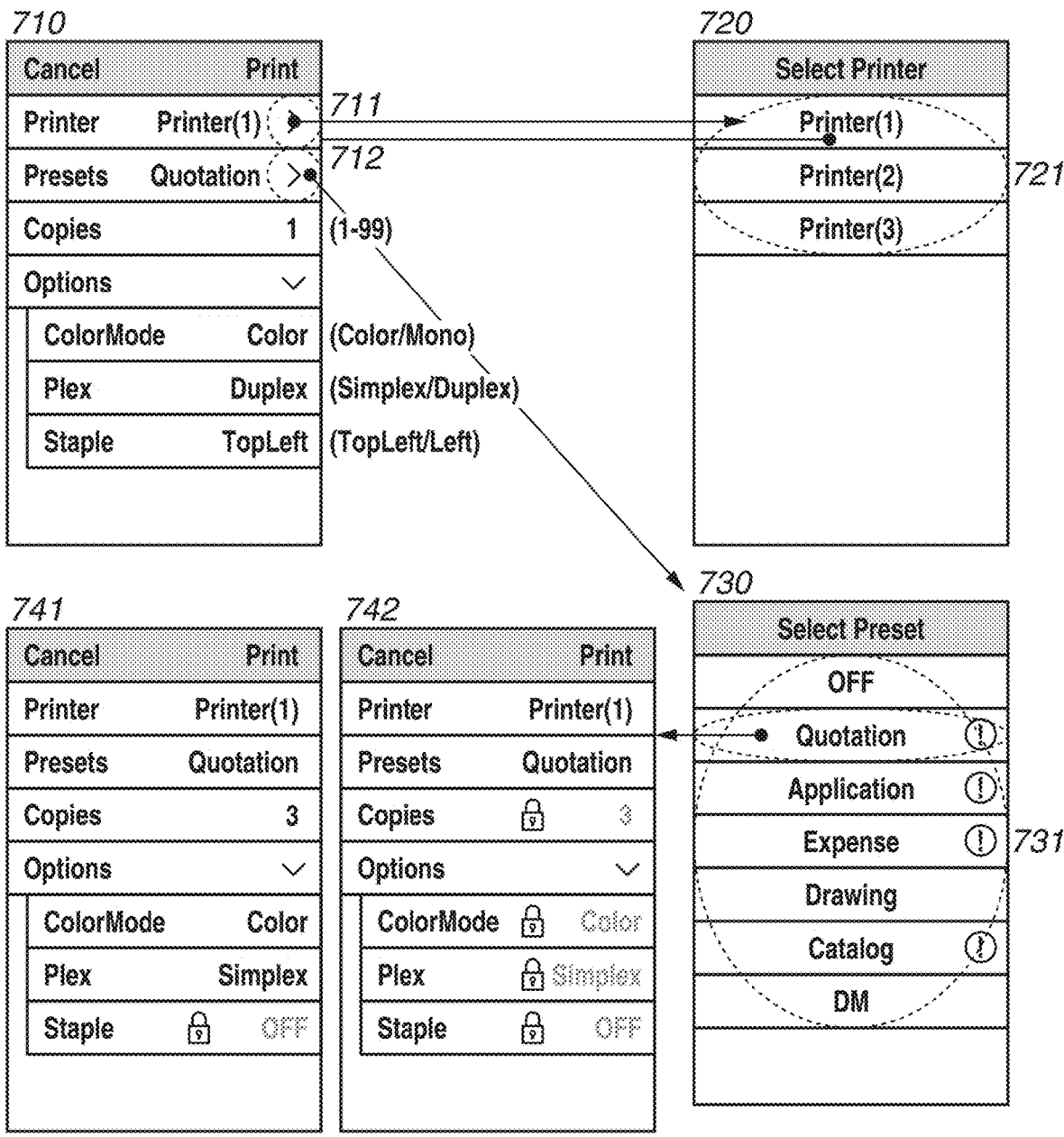
FIG. 7 is a diagram illustrating an example of a print setting screen displayed on the information processing apparatus.

FIG. 7 is an example of the print setting screen 710 of the information processing apparatus.

The print setting screen 710 displays print setting items according to an capability notification from the printing apparatus 101. Print setting items differ depending on the capability notifications from printers. Thus, if a selected printer indicated by a print setting item 711 is switched through a printer selection list 721 on a screen 720, the setting items displayed on the print setting screen 710 also change. A print setting item 712 indicates a preset selected from a preset selection list (731) on a screen 730. To apply or switch the preset, the preset to be applied is selected from the preset selection list (731) on the screen 730. The preset selection list (731) on the screen 730 displays a list of presets notified from the printer. When the preset is applied, if a change in a setting is restricted, "!" is displayed. "!" is displayed based on the determination result of the preset analysis unit (315). The processing of the preset analysis unit (315) will be described with reference to step S9104 and a flowchart 9200 in FIG. 9A.

If the preset is applied, the preset is reflected in the display content of the print setting screen 710. If the preset includes an attribute or an attribute value that is not supported by the information processing apparatus, some or all of the setting items cannot be changed. A "key" mark is displayed on an item that cannot be changed, and the setting value of the item is displayed in gray. In an example 741, some of the setting items, namely Staple (stapling), cannot be changed. In an example 742, all the setting items cannot be changed. Items on the print setting screen 710 are restricted by the preset processing unit (317) of the print screen control unit (311). Examples of the respective processes will be described with reference to step S9108 and flowcharts 9300 and 9400. Examples of a case where setting items cannot be changed also include the process of allowing conflicting settings to be input on the print setting screen 710, but the changed print settings are prohibited from being transmitted to the printing apparatus 101, and the process of transmitting the changed print settings to the printing apparatus 101 while prohibiting the printing apparatus 101 from executing printing based on the transmitted settings.

FIG. 11 is a block diagram illustrating the hardware configuration of the printing apparatus 101 according to the present exemplary embodiment. The printing apparatus 101 has a printing function for printing an image on a sheet. Although the present exemplary embodiment is described using a printing apparatus as an example, a printing apparatus such as an MFP in which a printing apparatus has a scanner function and a fax function may also be used. A control unit 1100 including a CPU 1101 controls the operation of the entirety of the printing apparatus 110. The CPU 1101 loads a program stored in a ROM 1102 or storage 1104 into a RAM 1103 and executes the program, thereby performing various types of control such as printing control and reading control. The ROM 1102 stores a control program. and a boot program that can be executed by the CPU 1101. The RAM 1103 is a main storage memory of the CPU 1101 and is used as a work area or a temporary storage area into which various control programs are loaded. The storage 1104 stores print data, image data, various programs, and various pieces of setting information. In the present exemplary embodiment, as the storage 1104, an auxiliary storage device such as an HDD is used. Alternatively, a non-volatile memory such as an SSD may be used.

Figure 8:
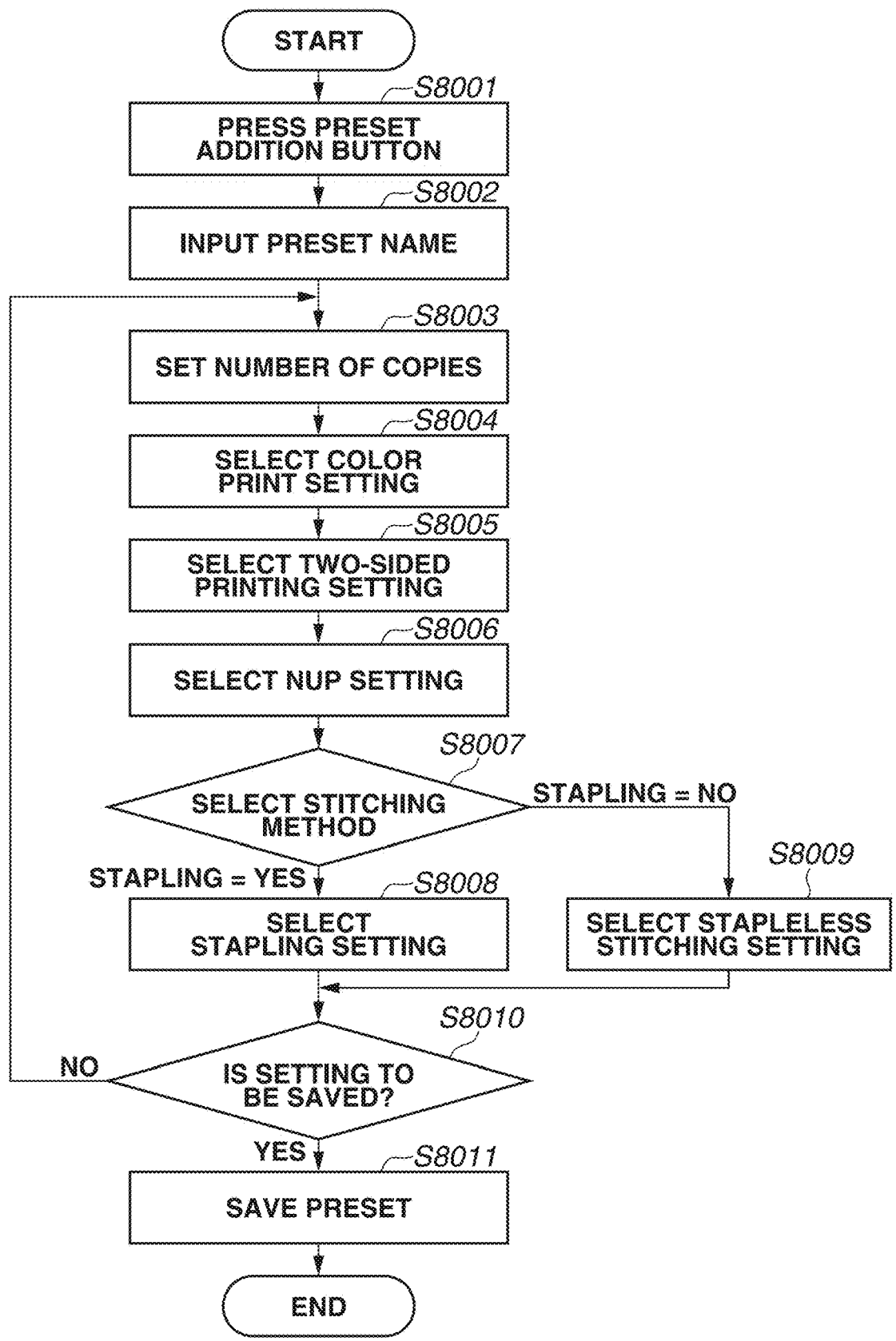
FIG. 8 is a diagram illustrating an example of a flowchart in which a print preset is registered in the printing apparatus.

In the printing apparatus 101 according to the present exemplary embodiment, a single CPU 1101 executes processes illustrated in a flowchart in FIG. 8, using a single memory (the RAM 1103). Alternatively, another form may be employed. For example, a plurality of CPUs, RAMs, ROMs, and spaces of storage may cooperate to execute the processes illustrated in the flowcharts described below. Alternatively, some of the processes may be executed using a hardware circuit such as an application-specific integrated circuit (ASIC) or a field-programmable gate array (FPGA).

An operation unit interface (I/F) 1106 connects an operation unit 1107 and the control unit 1100. The operation unit 1107 includes a display unit having a touch panel function and various hardware keys, and functions as a display unit that displays information, and a reception unit that receives an instruction from the user. A printing unit I/F 1108 connects a printing unit (printer engine) 1109 and the control unit 1100. Image data generated by analyzing a print job received from the information processing apparatus is transferred from the control unit 1100 to the printing unit 1109 via the printing unit I/F 1108. The printing unit 1109 receives via the control unit 1100 a control command and a print job to be printed. Then, based on the print job, the printing unit 1109 prints an image on a sheet fed from a sheet feeding cassette (not illustrated). The printing method of the printing unit 1109 may be an electrophotographic method, or an inkjet method. Alternatively, another printing method such as a thermal transfer method can also be used. The control unit 1100 is connected to the LAN 100 via a communication unit I/F 1112.

An image processing unit 1105 has the function of a raster image processor (RIP) that rasterizes a print job received via the communication unit I/F 1112, thereby generating image data for use in printing. The image processing unit 1105 can also perform a resolution conversion process and a correction process on the image data obtained by rasterizing the print job. The present exemplary embodiment assumes that the image processing unit 1105 is realized by a hardware circuit (an ASIC or an FPGA). The present invention, however, is not limited to the embodiment. Alternatively, for example, the printing apparatus 101 may further include a processor for image processing, and the processor may execute an image processing program, thereby realizing image processing and a rasterization process on print data. In this case, the processor and the CPU 1101 cooperate to realize the flowcharts described below. Yet alternatively, a configuration can also be employed in which the CPU 1101 executes a program for performing image processing, thereby performing image processing and a rasterization process on print data. Yet alternatively, image processing may be performed based on the combination of any of these methods.

The sheet processing unit I/F 1110 connects the control unit 1100 and a sheet processing unit 1111. The sheet processing unit 1111 receives a control command from the control unit 1100, and according to the control command, performs post-processing on a sheet on which an image is printed by the printing unit 1109.

FIG. 8 is a processing flowchart illustrating an example of the registration of a preset performed on the operation unit panel 1107 of the printing apparatus 101. Operations (steps) illustrated in FIG. 8 are realized as follows. The processes of the steps are executed by the CPU 1101 loading a program stored in the ROM 1102 or the storage 1104 into the RAM 1103 and executing the program.

In step S8001, the CPU 1101 detects that a preset addition button (not illustrated) displayed on the operation unit panel 1107 of the printing apparatus 101 is pressed. Then, the CPU 1101 starts the preset addition process. The CPU 1101 displays a preset setting input screen (not illustrated) on the operation unit panel 1107.

In step S8002, the CPU 1101 receives a preset name from the user.

In step S8003, the CPU 1101 receives the input of the number of copies of the preset from the user.

In step S8004, the CPU 1101 receives the selection of a color mode of the preset from the user.

In step S8005, the CPU 1101 receives the selection of a two-sided printing setting of the preset from the user.

In step S8006, the CPU 1101 receives the selection of an Nup setting of the preset from the user.

In step S8007, the user selects a stitching process of the preset to be registered. If stapling is selected in step S8007 (YES in step S8007), the processing proceeds to step S8008. If stapleless stitching is selected in step S8007 (NO in step S8007), the processing proceeds to step S8009.

In step S8008, the CPU 1101 receives the selection of a stitching position of the stapling.

In step S8009, the CPU 1101 receives the selection of the stitching position of the stapleless stitching from the user.

If the CPU 1101 detects in step S8010 that a preset saving button (not illustrated) is pressed (YES in step S8010), the processing proceeds to step S8011.

In step S8011, the CPU 1101 saves the preset having the input contents in the storage 1104, and the processing is ended.

In the present exemplary embodiment, preset registration is carried out on the operation unit panel 1107 of the printing apparatus 101. Alternatively, a configuration may he employed in which a preset is registered in a web service built into the printing apparatus 101 through a browser in the information processing apparatus (103 or 104).

Figure 9A:
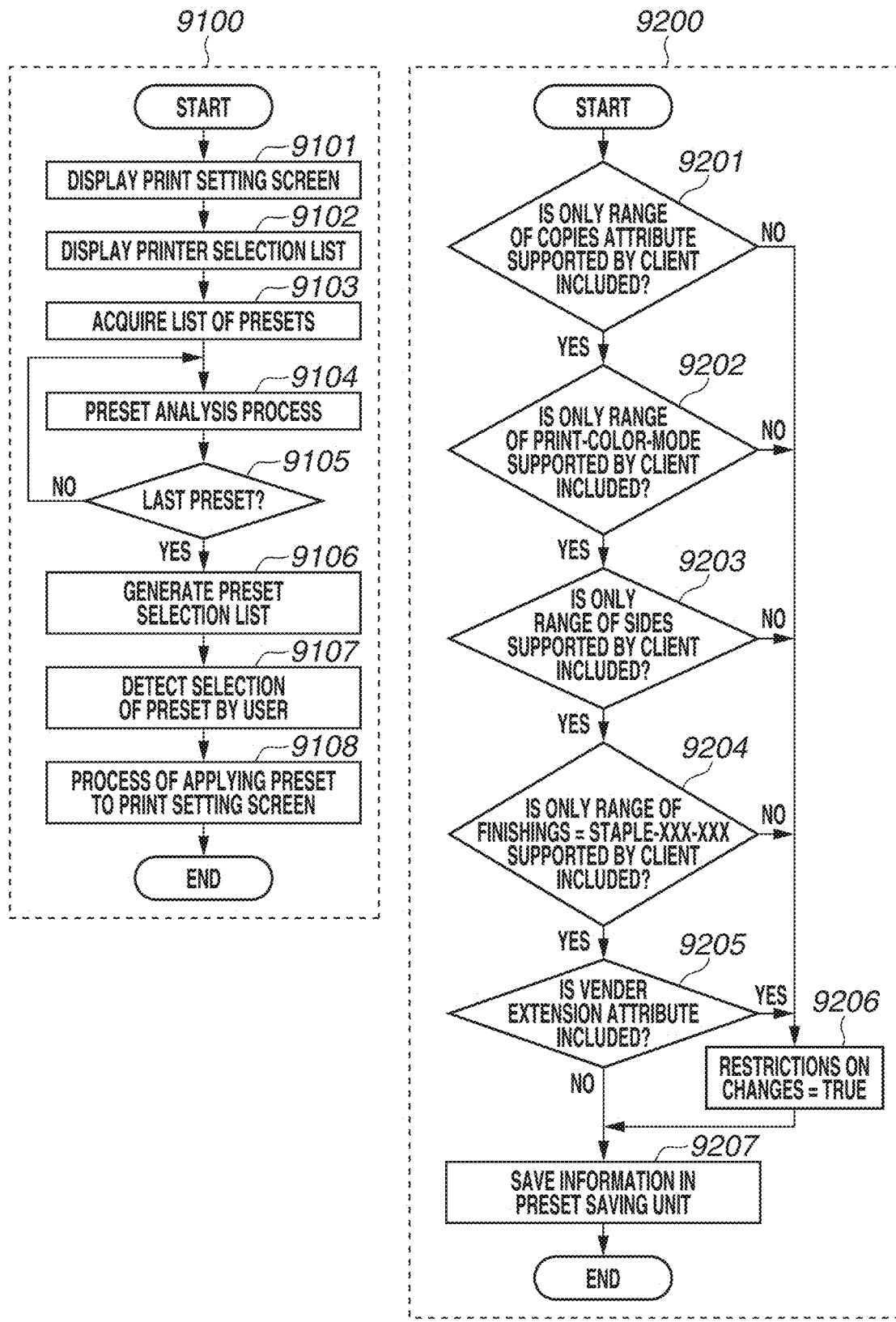
FIGS. 9A, 9B, and 9C are each a diagram illustrating an example of a flowchart in which the information processing apparatus acquires print presets and displays the print presets as options on a print setting screen, and examples of flowcharts in which it is detected that a user selects a preset, and setting values on the print setting screen are changed.
Figure 9B:
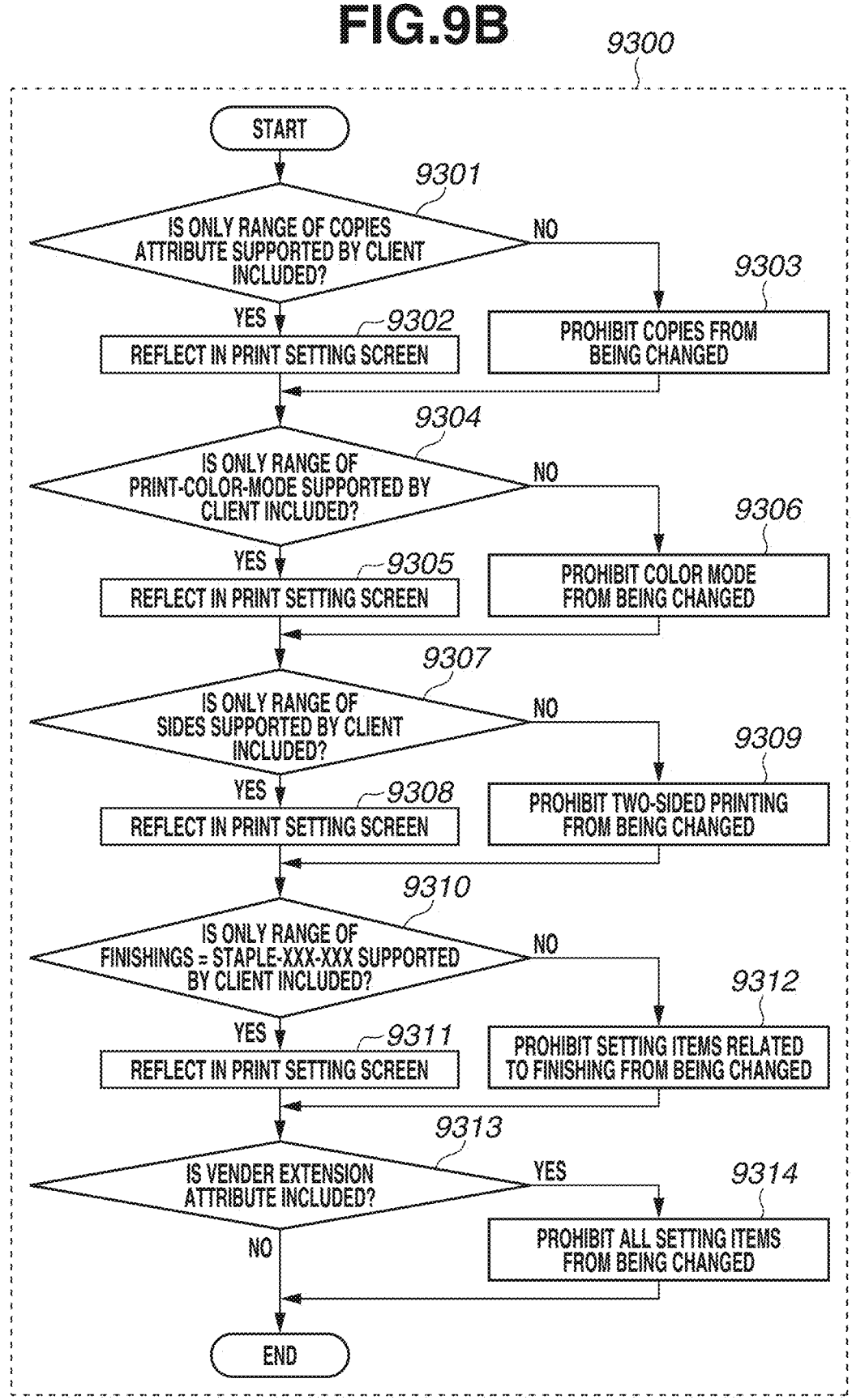
Figure 9C:
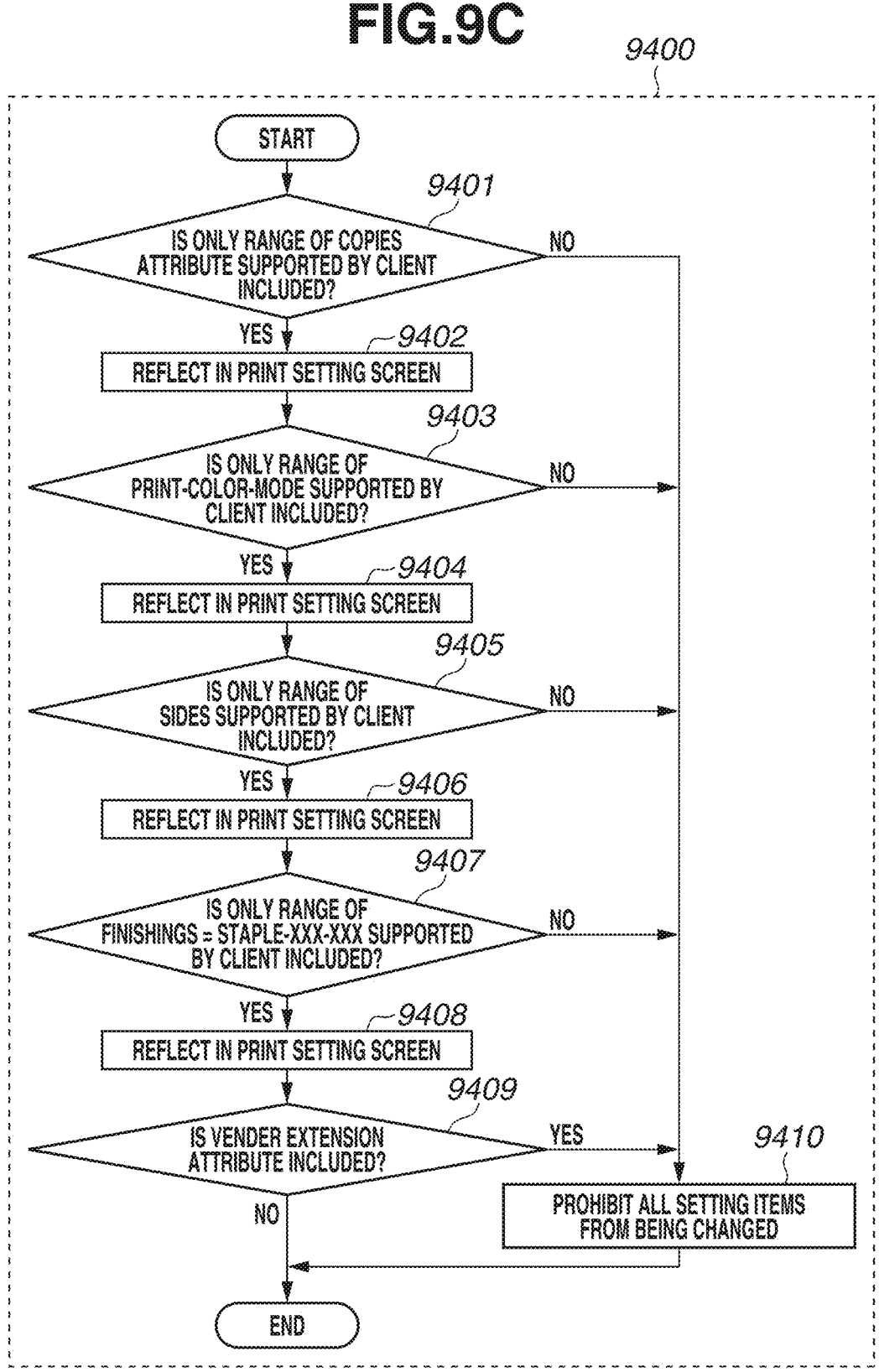

FIGS. 9A, 9B, and 9C each illustrate a flowchart in which the information processing apparatus acquires print presets and displays the print presets as options on the print setting screen, and flowcharts in which it is detected that the user selects a preset, and setting values on the print setting screen are changed. Operations (steps) illustrated in the flowcharts in FIGS. 9A, 9B, and 9C are realized by the CPU 201 loading a program stored in the ROM 204 or the storage 203 into the RAM 202 and executing the program. Consequently, the processes in FIGS. 9A, 9B, and 9C are executed. However, to clearly illustrate a control program that causes the operations, the operations are described as being executed by the functions based on programs.

In step S9101, the print screen control unit (311) receives a print request from the application (301) and displays the print setting screen (710). in step S9102, if it is detected that the user operation for selecting an output destination printer is received, the print screen control unit (311) displays a printer selection list on the print setting screen (710). In step S9103, if a user operation for selecting an output destination printer is received, a print control unit (313) cooperates with the printer information management unit (304) to acquire capability information and preset information regarding the selected printer. In step S9104, the preset analysis unit (315) analyzes the acquired presets and saves the analyzed presets in the preset saving unit (316). The details of the analysis/saving process in step S9104 will be described with reference to the flowchart 9200. In step S9105, the preset analysis unit (315) determines whether the analysis of the presets is completed. if the analysis of the last preset is completed (YES in step S9105), the processing proceeds to step S9106. If the analysis of the last preset is not completed (NO in step S9105), the processing returns to step S9104. In step S9104, the preset analysis unit (315) analyzes the presets. In step S9106, the setting screen control unit (311) receives the preset information corresponding to the output destination printer from the preset saving unit (316) and displays a list of the presets on the print setting screen (710). In step S9107, the setting screen control unit (311) detects that a user operation for selecting a single preset from the list is received through the print setting screen (710). In step S9108, the preset analysis unit (315) analyzes setting contents included in the preset and reflects the analysis result in the print setting screen (710). The details of the reflection of the preset in the print setting screen (710) in step S9108 will be described with reference to the flowcharts 9300 and 9400. The print setting screen (710) may be displayed on the touch panel 206.

The flowchart 9200 illustrates the details of the analysis/saving process performed by the preset analysis unit (315) in step S9104.

In step S9201, the preset analysis unit (315) determines whether a number-of-copies setting is included in the preset as an analysis target. If a number-of-copies setting is included in the preset, the preset analysis unit (315) verifies whether the setting value of the number-of-copies setting is within a supported range. If the setting value is within the supported range (YES in step S9201), the processing proceeds to step S9202. If the setting value is outside the supported range (NO in step S9201), the processing proceeds to step S9206. In this process, "whether the setting value is within the supported range" means whether the print service in the information processing apparatus can display the item on the print setting screen (710). The information processing apparatus stores settings supported by the print service in advance. Based on whether a setting received from the image forming apparatus is included in the settings stored in advance, the information processing apparatus determines whether the received setting is supported. The information processing apparatus can display a setting supported by the print service, and cannot display a setting that is not supported by the print service. The print service in the information processing apparatus corresponds to the OS print framework 302. The preset analysis unit (315) stores, for example, attributes having settings represented as "std" in the column 503 in FIG. 5. That is, for example, if only an attribute having a setting represented as "std" in the column 503 in FIG. 5 is included in the settings of the preset, it is determined that the setting value is within the supported range. In other words, for example, if the setting of an attribute other than the attributes having the settings represented as "std" in the column 503 in FIG. 5 is included in the settings of the preset, it may be determined that the setting value is outside the supported range. The following processes of determining whether the setting value is outside the supported range are similarly performed. An attribute other than the attributes having the settings represented as "std" in the column 503 in FIG. 5 is considered as a vendor extension attribute.

In step S9202, the preset analysis unit (315) determines whether a color mode setting is included in the preset as the analysis target. If the color mode setting is included in the preset, the preset analysis unit (315) verifies whether the color mode setting value is within the supported range. If the color mode setting value is within the supported range (YES in step S9202), the processing proceeds to step S9203. If the color mode setting value is outside the supported range (NO in step S9202), the processing proceeds to step S9206.

In step S9203, the preset analysis unit (315) determines whether a two-sided setting is included in the preset as the analysis target. If the two-sided setting is included as a setting value in the preset, the preset analysis unit (315) verifies whether the two-sided setting value is within the supported range. If the two-sided setting value is within the supported range, the processing proceeds to step S9204 (YES in step S9203). If the two-sided setting value is outside the supported range (NO in step S9203), the processing proceeds to step S9206.

In step S9204, the preset analysis unit (315) determines whether a stapling setting is included in the preset as the analysis target. If the stapling setting is included in the preset, the preset analysis unit (315) verifies whether the stapling setting value is within the supported range. If the stapling setting value is within the supported range (YES in step S9204), the processing proceeds to step S9205. If the stapling setting value is outside the supported range (NO in step S9204), the processing proceeds to step S9206.

In step S9205, the preset analysis unit (315) determines whether an attribute outside the range supported by the information processing apparatus (a vendor extension attribute) is included in the preset as the analysis target. If an attribute outside the range supported by the information processing apparatus (a vendor extension attribute) is included in the preset (YES in step S9205), the processing proceeds to step S9206. If an attribute outside the range supported by the information processing apparatus (a vendor extension attribute) is not included in the preset (NO in step S9205), the processing proceeds to step S9207.

In step S9206, the preset analysis unit (315) enables a restriction flag indicating that changes in print settings are restricted, and the processing proceeds to step S9207.

As described above, it is determined whether each of items such as a stapling setting, a color mode setting, and a number-of-copies setting includes a setting outside support. In the following processing, a setting item that is outside the support according to the determination is prohibited from being changed.

The flowcharts 9300 and 9400 illustrate the details of the process of step S9108 performed by the setting screen control unit (311) when displaying the print setting screen (710). By executing either of the flowcharts 9300 and 9400, it is possible to prohibit some or all of the setting items on the print setting screen (710) from being changed.

The flowchart 9300 illustrates the example (741) where it is verified whether each of the setting items on the print setting screen (710) has a value outside the supported range, and a setting item in which a value outside the supported range is detected is prohibited from being changed. The preset analysis unit (315) reads a selected preset from the preset saving unit (316) and analyzes the setting contents of the selected preset The setting screen control unit (311) receives the analysis result of the setting contents of the selected preset from the preset analysis unit (315).

In step S9301, the setting screen control unit (311) receives the analysis result of a number-of-copies setting from the preset analysis unit (315). If the number-of-copies setting of the preset has a value within the supported range (YES in step S9301), the processing proceeds to step S9302. If the number-of-copies setting has a value outside the supported range (NO in step S9301), the processing proceeds to step S9303.

In step S9302, the setting screen control unit (311) reflects the value specified by the preset as a preset setting value in a number-of-copies setting item on the print setting screen (710).

In step S9303, the setting screen control unit (311) prohibits the number-of-copies setting item from being changed.

In step S9304, the setting screen control unit (311) receives the analysis result of a color mode setting from the preset analysis unit (315). If the color mode setting of the preset has a value within the supported range (YES in step S9304), the processing proceeds to step S9305. If the color mode setting has a value outside the supported range (NO in step S9304), the processing proceeds to step S9306.

In step S9305, the setting screen control unit (311) reflects the value specified by the preset as a preset setting value in a color mode setting item on the print setting screen (710).

In step S9306, the setting screen control unit (311) prohibits the color mode setting item from being changed.

In step S9307, the setting screen control unit (311) receives the analysis result of a two-sided setting from the preset analysis unit (315). If the two-sided setting of the preset has a value within the supported range (YES in step S9307), the processing proceeds to step S9308. If the two-sided setting has a value outside the supported range (NO in step S9307), the processing proceeds to step S9309.

In step S9308, the setting screen control unit (311) reflects the value specified by the preset as a preset setting value in a two-sided setting item on the print setting screen (710).

In step S9309, the setting screen control unit (311) prohibits the two-sided setting item from being changed.

In step S9310, the setting screen control unit (311) receives the analysis result of a stapling setting from the preset analysis unit (315). If the stapling setting of the preset has a value within the supported range (YES in step S9310), the processing proceeds to step S9311. If the stapling setting has a value outside the supported range (NO in step S9310), the processing proceeds to step S9312.

In step S9311, the setting screen control unit (311) reflects the value specified by the preset as a preset setting value in a stapling setting item on the print setting screen (710).

In step S9312, the setting screen control unit (311) prohibits the two-sided setting item from being changed.

In step S9313, the setting screen contra unit (311) receives from the preset analysis unit (315) the result of analyzing whether an attribute outside the range supported by the information processing apparatus (a vendor extension attribute) is included in the preset. If a vendor extension attribute is not included (NO in step S9313), the processing is ended. If a vendor extension attribute is included (YES in step S9313), the processing proceeds to step S9314.

In step S9314, the setting screen control unit (311) prohibits all the setting items from being changed, and the processing is ended.

The flowchart 9400 illustrates the example (742) where, if one attribute or setting value outside the supported range is detected in a preset, all the setting items on the print setting screen (710) are prohibited from being changed. The preset analysis unit (315) reads a selected preset from the preset saving unit (316) and analyzes the setting contents of the selected preset. The setting screen control unit (311) receives the analysis result of the setting contents of the selected preset from the preset analysis unit (315).

In step S9401, the setting screen control unit (311) receives the analysis result of a number-of-copies setting from the preset analysis unit (315). If the number-of-copies setting of the preset has a value within the supported range (YES in step S9401), the processing proceeds to step S9402. If the number-of-copies setting has a value outside the supported range (NO in step S9401), the processing proceeds to step S9410. The determination of whether the setting has a value within or outside the supported range is similar to that described above. The same applies to the following processes.

In step S9402, the setting screen control unit (311) reflects the value specified by the preset as a preset setting value in a number-of-copies setting item on the print setting screen (710).

In step S9403, the setting screen control unit (311) receives the analysis result of a color mode setting from the preset analysis unit (315). If the color mode setting of the preset has a value within the supported range (YES in step S9403), the processing proceeds to step S9404, If the color mode setting has a value outside the supported range (NO in step S9403), the processing proceeds to step S9410.

In step S9404, the setting screen control unit (311) reflects the value specified by the preset as a preset setting value in a color mode setting item on the print setting screen (710).

In step S9405, the setting screen control unit (311) receives the analysis result of a two-sided setting from the preset analysis unit (315). If the two-sided setting of the preset has a value within the supported range (YES in step S9405), the processing proceeds to step S9406. If the two-sided setting has a value outside the supported range (NO in step S9405), the processing proceeds to step S9410.

In step S9406, the setting screen control unit (311) reflects the value specified by the preset as a preset setting value in a two-sided setting item on the print setting screen (710).

In step S9407, the setting screen control unit (311) receives the analysis result of a stapling setting from the preset analysis unit (315). If the stapling setting of the preset has a value within the supported range (YES in step S9407), the processing proceeds to step S9408. If the stapling setting has a value outside the supported range (NO in step S9407), the processing proceeds to step S9410.

In step S9408, the setting screen control unit (311) reflects the value specified by the preset as a preset setting value in a stapling setting item on the print setting screen (710).

In step S9409, the setting screen control unit (311) receives the analysis result of the preset analysis unit (315) and verifies whether an attribute outside the range supported by the information processing apparatus (a vendor extension attribute) is included in the preset. if a vendor extension attribute is not included (NO in step S9409), the processing is ended. If a vendor extension attribute is included (YES in step S9409), the processing proceeds to step S9410.

In step S9409, the setting screen control unit (311) receives from the preset analysis unit (315) the result of analyzing whether an attribute outside the range supported by the information processing apparatus (a vendor extension attribute) is included in the preset. If a vendor extension attribute is not included (NO in step S9409), the processing is ended. If a vendor extension attribute is included (YES in step S9409), the processing proceeds to step S9410.

In step S9410, the setting screen control unit (311) prohibits all the setting items from being changed, and the processing is ended.

Figure 10:
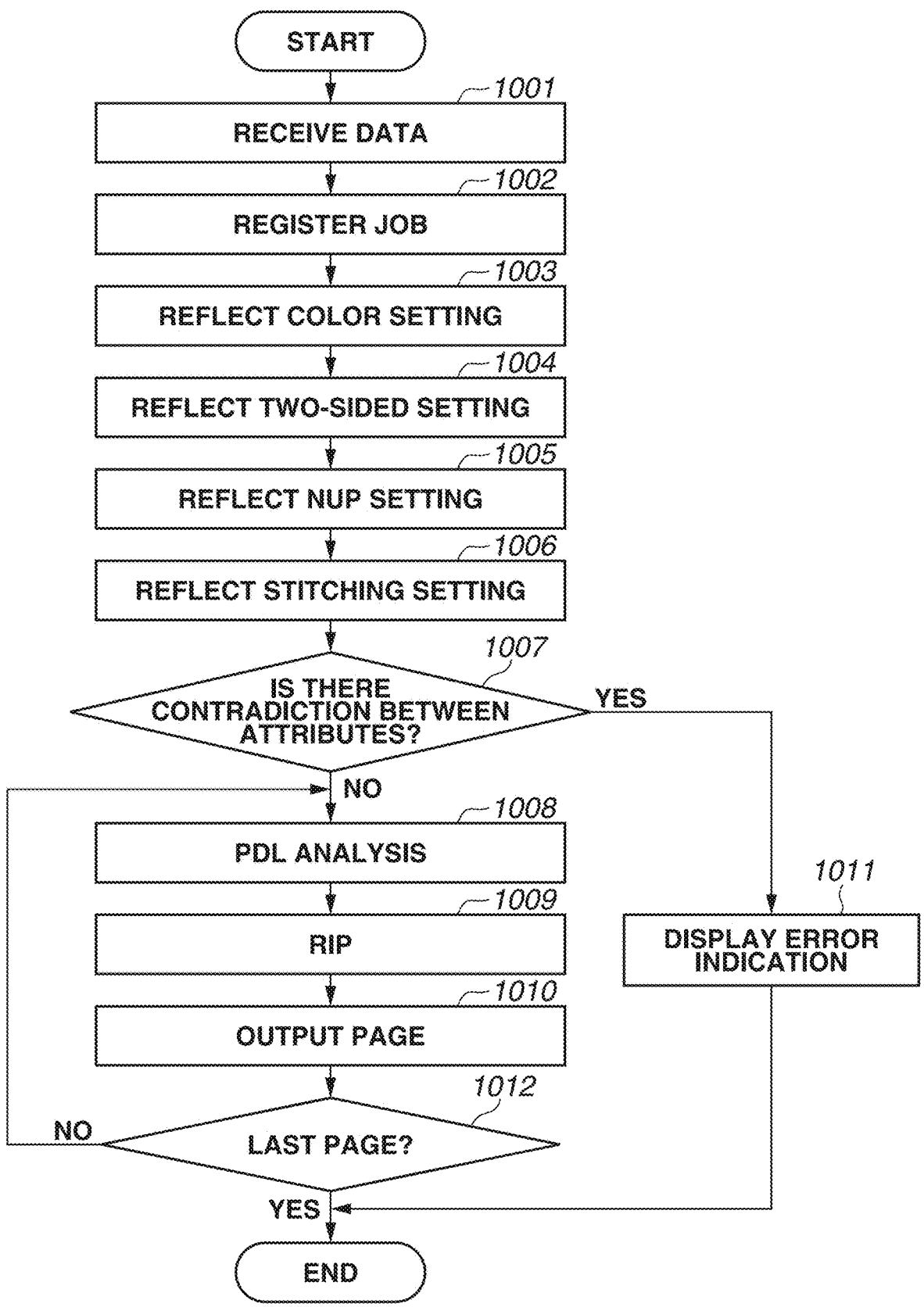
FIG. 10 is a diagram illustrating an example of a flowchart in which the printing apparatus processes a job in which presets are reflected.

FIG. 10 is a processing flow when the printing apparatus 101 receives a print job including the preset settings. Operations (steps) illustrated in FIG. 10 are realized by the CPU 1101 loading a program for realizing control modules stored in the ROM 1102 or the storage 1104 into the RAM 1103, and executing the program.

In step S1001, the printing apparatus 101 receives a print job via the communication unit I/F 1112.

In step S1002, if it is detected that a print job is received in step S1001, the CPU 1101 registers received data in a job list managed in the RAM 1103.

In steps S1003 to 1006, the CPU 1101 references IPP job attributes and document attributes in order and maps the IPP job attributes and document attributes to internal processing variables on the RAM 1103. In step S1003, the CPU 1101 reflects a color mode setting. In step S1004, the CPU 1101 reflects a two-sided printing setting. In step S1005, the CPU 1101 reflects an. Nup layout setting. In step S1006, the CPU 1101 reflects a stapling or stapleless stitching setting.

In step S1007, the CPU 1101 verifies whether there is a control contradiction between attributes. If there is no contradiction between attribute values and processes can be performed (NO in step S1007), the CPU 1101 repeats a PDL analysis process, an RIP process, and a printing process in steps S1008 to S1010 as many times as pages, and. the processing is ended.

If it is determined in step S1007 that there is a contradiction between attribute values (YES in step S1007), then in step S1011, the CPU 1101 displays an error indication anon unit panel 1107, and the job is ended. The error indication may include the content of the contradiction or the reason for determining that the contradiction is occurring.

In the above description, the mobile terminals 103 and 104 are examples of an information processing apparatus for executing a print service that transmits print data in which a setting regarding printing is made.

The touch panel 206 is an example of a reception unit configured to receive a complex setting including a plurality of settings regarding printing from an image forming apparatus. The storage 203 is an example of a holding unit configured to hold a setting that is not supported by the print service among the settings regarding printing included. in the complex setting, without changing the setting. The touch panel 206 is an example of a display unit configured to display a setting screen which can give an instruction to change a setting supported by the print service among the settings regarding printing included in the complex setting.

The touch panel 206 is an example of a transmission unit configured to transmit to the image forming apparatus a setting regarding printing made according to an instruction given through the setting screen, and the setting regarding printing held in the holding unit. If the setting information regarding printing received by the touch panel 206 does not include a setting regarding printing that is not supported by the print service, the touch panel 206 displays the setting screen including display related to the setting regarding printing received by the touch panel 206. The touch panel 206 is an example of a display unit. The CPU 201 controls the touch panel 206 to allow the setting to be changed according to an instruction given on the setting screen.

If the setting information regarding printing received by the touch panel 206 includes a setting that is not supported by the print service, the touch panel 206 displays the setting screen which cannot change a setting item corresponding to the print setting. The CPU 201 is an example of a control unit and controls the touch panel 206.

If the setting information regarding printing received by the touch panel 206 does not include the print setting that is not supported by the print service, the touch panel 206 displays the setting screen which can change the value of a setting item of the print setting received by the touch panel 206. The touch panel 206 is controlled to allow the setting value of the setting item to be changed according to an instruction given on the setting screen. An example of the setting screen is illustrated in FIG. 7. Examples of a form in which the setting value of the setting item is allowed to be changed according to an instruction given on the setting screen include a form in which another setting screen is called through the screen to set the setting value of the setting item.

If the setting information regarding printing received by the touch panel 206 includes the print setting that is not supported by the print service, a setting item corresponding to the print setting is grayed out or is not displayed. Instead of gray-out, the setting item corresponding to the print setting can also be locked by using a key mark.

The setting information regarding printing received by the touch panel 206 includes at least one of information regarding finishing, a color mode, and number-of-copies specifying. As a matter of course, the setting information regarding printing may include the combination of these pieces of information.

If the setting information regarding printing received by the touch panel 206 includes a print setting that is not supported by the print service, at least some of setting items corresponding to at least one of the finishing, the color mode, and the number-of-copies specifying are set as follows. In the case of the finishing, for example, only stapling can be prohibited from being changed, and finishing setting items other than the stapling can be allowed to be changed. The touch panel 206 displays the setting screen in the state where the setting items are grayed out or are not displayed. Not all the settings regarding printing supported by the print service need to be displayed. For example, even if the print service supports settings A, B, and C, only the setting A may be displayed.

Suppose the setting information regarding printing received by the touch panel 206 includes information regarding stapling specifying. if the setting information regarding printing received by the touch panel 206 includes an argument of a stapling setting that is not supported by the print service, the touch panel 206 displays the setting screen in the state where a setting item corresponding to the stapling specifying is grayed out or is not displayed.

A setting regarding printing that is not supported by the print service may be a setting that is not supported by a print service of a standard OS.

Control is performed as described above, whereby it is possible to restrict changes in print settings by the user after a preset is applied, and prevent a conflict between print settings. Consequently, the conflict of a host terminal (an IPP client) can be avoided to realize both two functions expected of IPP presets (providing a method for collectively setting a plurality of items, and providing a method for setting favorites including extension settings), wherever possible.

That is, if extension information is included in information regarding presets provided by a printing apparatus, a host is prohibited from editing the presets, thereby preventing the occurrence of a conflict between settings of a print job. If extension information is not included in the presets, the host is allowed to edit the presets, thereby providing a method for changing some of the presets to the user.

This gives, based on the IPP, the effect of realizing both 1) the application of simplified settings of presets and partial changes by the user, and 2) the application of extension information by presets.

According to the present invention, an image forming apparatus can utilize a setting regarding printing that a predetermined print service of a client does not support.

Other Embodiments

Embodiment(s) of the present invention can also he realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097147, filed May 23, 2019, which is hereby incorporated by reference herein in its entirety.

What is claimed is:

1. An information processing apparatus comprising a controller including a processor, the controller configured to:
receive, from an image forming apparatus, an identifier registered to the image forming apparatus;
receive a user instruction for selecting the received identifier;
display a print setting screen for setting a value of a first print setting item in a situation that the received identifier is selected;
generate print data including the value set via the displayed print setting screen, wherein the controller performs control such that the print data does not include a value of the first print setting item conflicting with a value of a second print setting item that is not displayed on the print setting screen and corresponds to the selected identifier; and
transmit the generated print data to the image forming apparatus.

2. The information processing apparatus according to claim 1, wherein the generated print data includes the value of the first print setting item set via the displayed print setting screen and the value of the second print setting item.

3. The information processing apparatus according to claim 1, wherein the controller displays the value of the second print setting item such that the value of the second print setting item cannot be changed.

4. The information processing apparatus according to claim 1, wherein the print setting screen does not include the value of the second print setting item.

5. The information processing apparatus according to claim 1, wherein the second print setting item is a setting item regarding post-processing on a sheet on which an image is formed by the image forming apparatus.

6. The information processing apparatus according to claim 5, wherein the first print setting item is a setting item regarding an image formed by the image forming apparatus.

7. The information processing apparatus according to claim 1, wherein the controller is further configured to:
receive, from the image forming apparatus, the value of the first print setting item corresponding to the registered identifier; and
perform control such that the received value of the first print setting item is not changed to the value of the first print setting item conflicting with the value of the second print setting item.

8. The information processing apparatus according to claim 1, wherein the controller is further configured to receive the value of the first print setting item corresponding to the received identifier; and
wherein the print data includes a value of the first print setting item changed from the received value of the first print setting item via the print setting screen.

9. The information processing apparatus according to claim 1, wherein the identifier is selected via the displayed print setting screen.

10. The information processing apparatus according to claim 1, wherein the value of the first print setting item and the value of the second print setting item is registered to the image forming apparatus corresponding to the identifier.

11. The information processing apparatus according to claim 1, wherein the first print setting item is supported by a print service executed by the information processing apparatus and the second print setting item is not supported by the print service.

12. An information processing apparatus- comprising
a controller including a processor, the controller configured to:
receive, from an image forming apparatus, an identifier registered to the image forming apparatus;
receive a user instruction for selecting the received identifier;
display a print setting screen for setting a value of a first setting item in a situation that the received identifier is selected, wherein the controller performs control such that a value of the first setting item conflicting with a value of a second setting item that corresponds to the received identifier and is not displayed on the displayed print setting screen is not able to be set via the displayed print setting screen;
generate print data based on the value of the first setting item set via the displayed print setting screen; and
transmit the generated print data to the image forming apparatus.

13. The information processing apparatus according to claim 12, wherein the controller receives a user instruction for changing the value of the first print setting item to a value of the first print setting item that does not conflict with the value of the second print setting item and generates the print data including the value of the first print setting item that has been changed based on the received user instruction.

14. The information processing apparatus according to claim 12, wherein the generated print data includes the value of the first print setting item and the value of the second print setting item.

15. The information processing apparatus according to claim 12, wherein the second setting item is a setting item regarding post-processing on a sheet on which an image is printed by the image forming apparatus.

16. A control method for controlling an information processing apparatus, the control method comprising:
- receiving, from an image forming apparatus, an identifier registered to the image forming apparatus;
- receiving a user instruction for selecting the received identifier;
- based on the selection of the received identifier, displaying a print setting screen for setting a value of a first print setting item;
- generating print data including the value set via the displayed print setting screen;
- controlling such that the print data does not include a value of the first print setting item conflicting with a value of a second print setting item that is not displayed on the print setting screen and corresponds to the selected identifier; and
- transmitting the generated print data to the image forming apparatus.

17. A non-transitory computer-readable storage medium storing a program, that, when executed by a computer, cause the computer to perform a method comprising:
- receiving, from an image forming apparatus, an identifier registered to the image forming apparatus;
- receiving a user instruction for selecting the received identifier;
- displaying a print setting screen for setting a value of a first print setting item in a situation that the received identifier is selected;
- generating print data including the value set via the displayed print setting screen, wherein control is performed such that the print data does not include a value of the first print setting item conflicting with a value of a second print setting item that is not displayed on the print setting screen and corresponds to the selected identifier; and
- transmitting the generated print data to the image forming apparatus.

* * * * *